United States Patent [19]

Nakabayashi et al.

[11] Patent Number: 4,879,715
[45] Date of Patent: Nov. 7, 1989

[54] TERMINAL EQUIPMENT IDENTIFIER CONTROLLING CIRCUIT

[75] Inventors: Takeo Nakabayashi; Hideki Andou, both of Itami, Japan

[73] Assignee: Mitsubishi Denki Kabushiki Kaisha, Japan

[21] Appl. No.: 217,011

[22] Filed: Aug. 22, 1988

[30] Foreign Application Priority Data

Jan. 19, 1988 [JP] Japan ................................. 63-9951

[51] Int. Cl.⁴ ............................................ H04J 3/24
[52] U.S. Cl. .................................. 370/92; 340/825.52
[58] Field of Search ....................... 370/94, 92, 110.1; 340/825.52, 825.21, 825.53

[56] References Cited

U.S. PATENT DOCUMENTS

| 3,790,717 | 2/1974 | Abramson et al. | 370/92 |
| 4,628,315 | 12/1986 | Douglas | 340/825.52 |
| 4,689,786 | 8/1987 | Sidhu et al. | 370/94 |
| 4,788,637 | 11/1988 | Tamaru | 370/94 |

OTHER PUBLICATIONS

Siemens, ICC (ISDN Communication Controller) PEB 2070 Technical Description.
Motorola, Semiconductor, Technical Data, Dual Data Link Controller (DDLC).

Primary Examiner—Douglas W. Olms
Attorney, Agent, or Firm—Townsend & Townsend

[57] ABSTRACT

The present invention relates to a circuit controlling terminal equipment identifiers identifying said terminal equipment in a communicating apparatus wherein a number of the above-mentioned terminal equipment are connected to a network, and makes it possible to reduce the amount of hardware make the operation faster and facilitate the control of TEI assignment by using the address of a memory storing binary data as the TEI value.

5 Claims, 6 Drawing Sheets

(a) through (f): 8×8 grids indexed by HIGH ORDER 3BITS (columns: 000, 001, 010, 011, 100, 101, 110, 111) and LOW ORDER 3BITS (rows: 000, 001, 010, 011, 100, 101, 110, 111).

(a) All cells are 0.

(b) All cells are 0 except row 100, column 010 = 1.

(c) 
- row 001, column 111 = 1
- row 011, column 100 = 1
- row 100, column 010 = 1
- row 111, column 000 = 1
- all others 0

(d)
- row 001, column 111 = 1
- row 011, column 100 = 1
- row 100, column 010 = 1
- row 111, column 000 = 1 (hatched)
- all others 0

(e)
- row 001, column 111 = 1
- row 010, column 001 = 0 (hatched)
- row 011, column 100 = 1
- row 100, column 010 = 1
- row 111, column 000 = 1
- all others 0

(f)
- row 011, column 100 = 1
- row 100, column 010 = 1
- row 111, column 000 = 1
- all others 0

TERMINAL EQUIPMENT IDENTIFIER CONTROLLING CIRCUIT

BACKGROUND OF THE INVENTION

1. Field of the Invention

The present invention relates to a communicating apparatus wherein a number of terminal equipment are connected to a network, and to be further detailed, it relates to a circuit controlling terminal equipment identifiers identifying terminal equipment.

2. Description of the Prior Art

Figure 1:
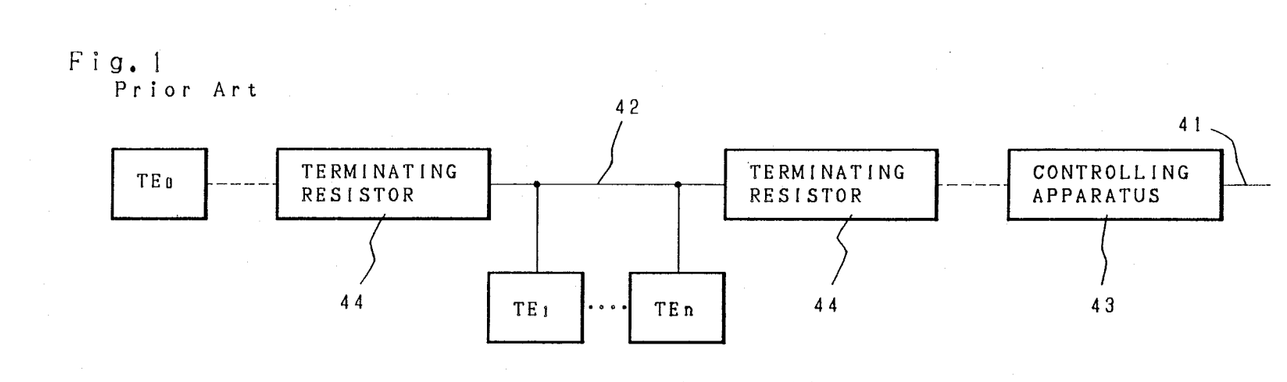
FIG. 1 is a block diagram of the conventional apparatus.

The apparatus performing communication processing according to the HDLC (High-level Data Link Control)-type data link layer controlling procedure has been known. FIG. 1 shows a configuration of an in-house network shown in the CCITT Recommendation I.430, and a subscriber line 41 such as a telephone line controls an in-house bus 42, and a controlling apparatus 43 terminating the subscriber line is connected thereto, and terminal equipments TE0, TE1 . . . TEn such as a telephone and a facsimile are connected to the in-house bus 42. Numerals 44 in the figure designate terminating resistors.

In the above-mentioned Recommendation, one telephone number corresponds to one controlling apparatus 43, and discrimination of the terminal equipments TE0, TE1 . . . TEn is made using subaddresses called terminal equipment identifiers TEI. For this reason, it is prescribed that the terminal equipment stores the TEI value thereof, and compares the TEI value of a received number with the TEI value of itself, and takes in the received signal when the both values match with each other.

Figure 2:
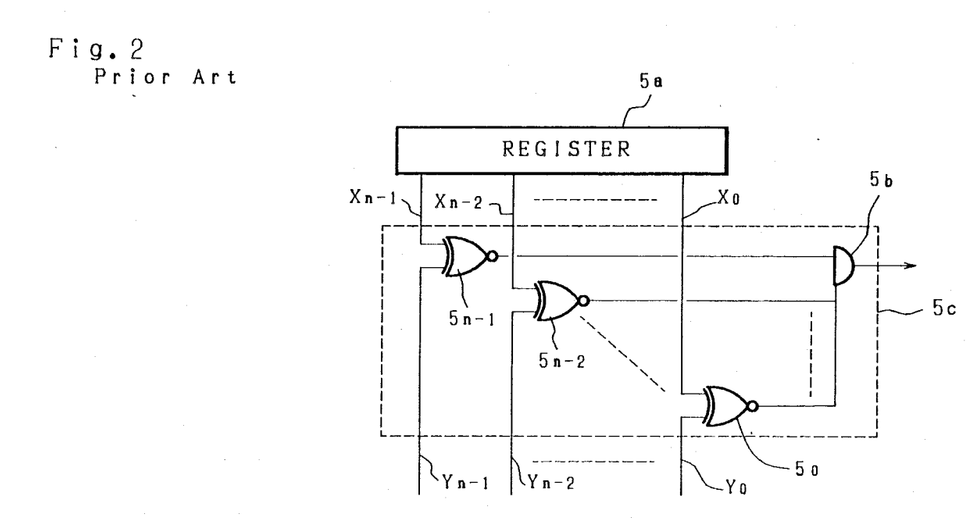
FIG. 2 is a circuit diagram of the conventional terminal equipment identifier controlling circuit.

FIG. 2 shows a terminal equipment identifier controlling circuit for performing this operation. Numeral 5a designates an n-bit register storing the TEI values of itself. Taking these values as $X_0 \ldots X_{n-2}, X_{n-1}$, these bits are given to exclusive NOR gates $5_0 \ldots 5_{n-2}, 5_{n-1}$. On the other hand, the TEI values of the received n bits $Y_0 \ldots Y_{n-2}, Y_{n-1}$ becomes another input of the above-mentioned exclusive NOR gates $5_0 \ldots 5_{n-2}, 5_{n-1}$, and the output thereof is inputted to an AND gate 5b of n input.

Numeral 5c designates a comparator constituted with the NOR gates $5_0, 5_{n-2}, 5_{n-1}$ and the AND gate 5bb. And, as obvious from the configuration of this comparator 5c, when the receieved TEI value and the TEI value of itself stored in the register 5a match with each other, a match output is obtained at the AND gate 5b, and thereby the terminal equipment judges that the received signal is for itself, and takes in this received signal transmitted with TEI values, and in the case of mismatch, it neglects that signal.

Then, in accordance with the CCITT Recommendation Q.921, one terminal equipment is allowed to have one or more TEI values. Accordingly, in the case where the equipment has a plurality of TEI values, a plurality of registers 5a and comparators 5c are required respectively, and thereby a problem exists that the amount of hardware is increased and the time required for comparison is extended.

Also, the TEI value to be assigned to one terminal equipment is unknown in designing and manufacturing it, and therefore another problem exists that no rational design can be performed.

In addition, apart from this, the network side is required to control the TEI values assigned to all terminal equipment.

SUMMARY OF THE INVENTION

A first object of this invention is to provide a terminal equipment identifier controlling circuit capable of easily storing a plurality of TEI values.

A second object of this invention is to provide a terminal equipment identifier controlling circuit capable of comparing a plurality of TEI values at one time.

A third object of this invention is to provide a terminal equipment identifier controlling circuit which can be universally designed and manufactured irrespective of the number of TEI values to be assigned and wherein the amount of hardware is constant.

A forth object of this invention is to provide a terminal equipment identifier controlling circuit capable of immediately judging whether or not the TEI value has been assigned in the main apparatus side.

A terminal equipment identifier controlling circuit in accordance with the present invention is designed to make the address of memory correspond to the TEI value. This means that it comprises a memory, a means for giving this memory a terminal equipment identifier as an address signal, a means for writing binary data to the address of the above-mentioned memory corresponding to the address signal given by this means and a means for reading binary data of this address.

In the terminal equipment, for example, "1" is written to the address of the memory corresponding to the terminal equipment identifier assigned to itself. Then terminal equipment identifier of the received signal is given to this memory as an address signal, and the data of the corresponding address is read. If the read data is "1", it can be judged that itself is destination, and if "0", it is judged that itself is not destination.

On the other hand, in the network side, in assigning a terminal equipment identifier to a terminal equipment, the identifier is given to this memory as an address signal, and, for example, "1" is written to the corresponding address. Then, whether or not the terminal equipment identifier has been assigned can be judged by reading this memory. If "1" is read, the assignment has been made, and if "0" is read, the assignment has not yet been made.

The above and further objects and features of the invention will more fully be apparent from the following detailed description with accompanying drawings.

DESCRIPTION OF THE PREFERRED EMBODIMENTS

Figure 3:
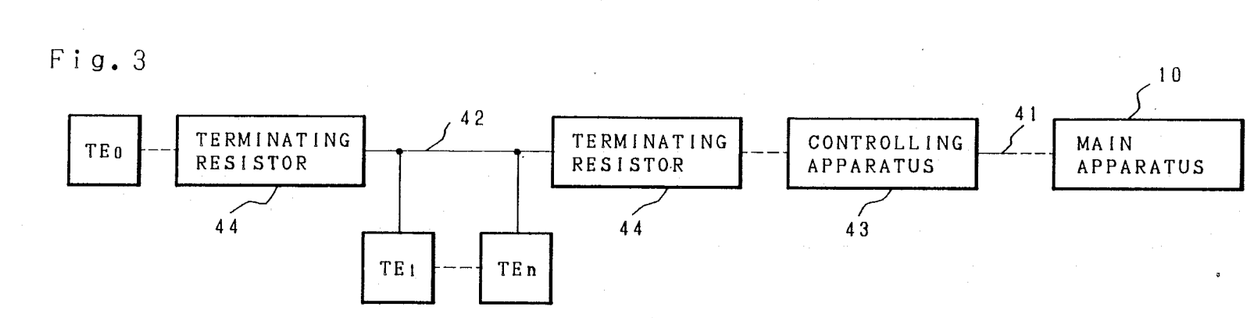
FIG. 3 is a block diagram showing the whole of a communicating apparatus in accordance with the present invention.
Figure 4:
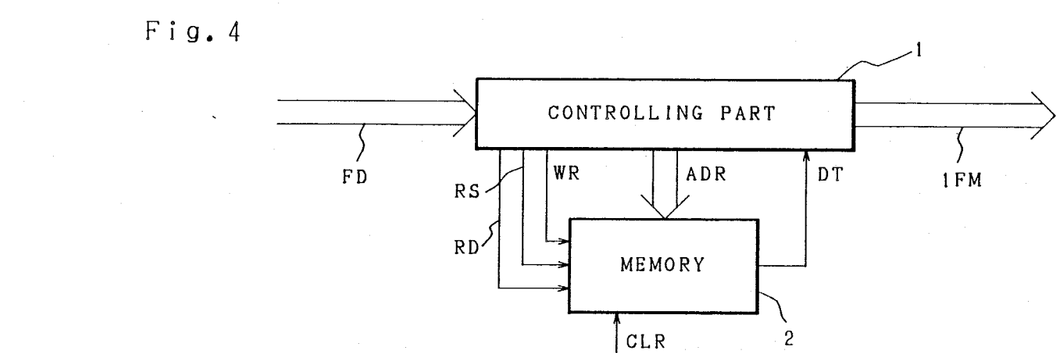
FIG. 4 is a block diagram of a major part of a circuit in the terminal equipment side in accordance with the present invention.
Figure 5:
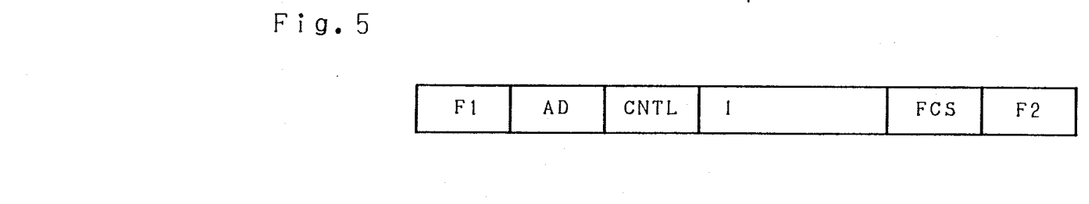
FIG. 5 is a format diagram of frame data.

Hereinafter, detailed description is made on the present invention on the basis of the drawings showing an embodiment thereof. FIG. 3 is a block diagram showing a schematic configuration of the whole apparatus in accordance with the present invention, and FIG. 4 is a block diagram showing a major part of terminal equipments thereof TE0, TE1 . . . TEn. FIG. 3 shows the configuration of the in-house network shown in the CCITT Recommendation I.430, and thereto a main apparatus 10 installed in a telephone exchange office or the like is connected through a subscriber line 41 such as a telephone line. The subscriber line 41 is connected to a controlling apparatus 43 controlling an in-house bus 42 and terminating the subscriber line 41, and the terminal equipments TE0, TE1 . . . TEn such as a telephone and a facsimile are connected to the in-house bus 42. In the figure, numerals 44, 44 designate terminating resistors. In FIG. 4, numeral 1 designates a control part making access to a memory 2 on the basis of the received signal and HDLC frame data FD is inputted thereto from the network side, that is, the main apparatus 10 through the subscriber line 41, the controlling apparatus 43, the terminating resistor 44 and the in-house bus 42. This frame data FD has a format as shown in FIG. 5, and consists of a flag F1 representing the head of the data, an address data AD including a terminal equipment identifier TEI, a control code part CNTL representing character or the like of the transmitted data, a data I to be transmitted, an error check data FCS and a flag F2 representing the end of the data. The controlling part 1 gives the data corresponding to the TEI from the address data AD to the memory 2 as an address signal ADR. Also, the controlling part 1 decodes the control code part CNTL, and outputs a write signal WR when writing "1", a release signal RS when writing "0", and a read signal RD when reading data from the memory 2 respectively in a select-one fashion to the memory 2 whereto access is made by the address signal ADR. A data DT read from the memory 2 is given to the controlling part 1. Also, the configuration is made so as to give a clear signal CLR to the memory 2 when resetting the contents of the whole addresses of the memory 2 to "0", and the clear signal CLR may be given by a switch or the like installed in the terminal equipment side or may be given from the network side.

The controlling part 1 judges whether or not the received data is for itself as described later, and when the data is for itself, it gives the data I or the like excluding the Flags F1 and F2 and the control code part CNTL to a post-stage circuit in the terminal equipment.

Figure 6:
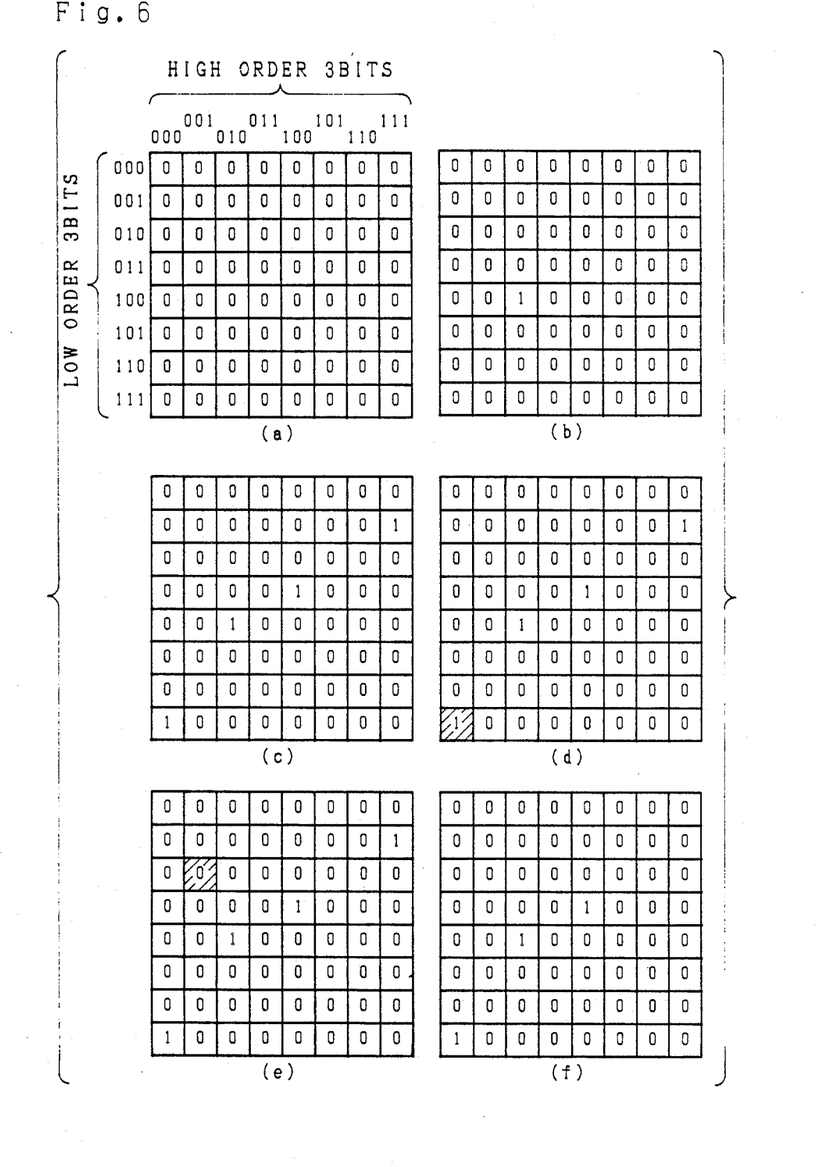
FIG. 6 is a concept view showing the contents of a memory.

Next, description is made on the operation of the apparatus in accordance with the present invention on the basis of FIG. 6 showing the stored contents of the memory 2. As shown in FIG. 6, the memory 2 has a configuration of 8×8 bits, and the high-order three bits of the address signal ADR (six bits) are taken as column address and the low-order three bits as row address. Before using this apparatus or a terminal equipment, the clear signal CLR is given to reset the memory 2. Then, all of the contents of the memory 2 become "0" as shown in FIG. 6 (a).

Subsequently, a TEI is assigned to that terminal equipment from the network side, and in this case, the address frame data AD received from the main apparatus 10 comprises the address data containing the assigned TEI value and the control code part CNTL having the contents showing that the transmitted signal is for assigning the TEI value. The controlling part 1 having received this outputs the write signal WR, and outputs the TEI value as the address signal ADR. In the case where the assigned TEI value is 20 (010100), "1" is written to the address of the third column (010) and the fifth row (100) shown in FIG. 6(b). Thereby, this terminal equipment is assigned the TEI value of "20".

Then, when the normal frame data FD is received in the subsequent communication, the controlling part 1 extracts the TEI value from the address data AD in that data, gives it to the memory 2 as the address signal ADR, and gives the read signal RD. In the case where the received TEI value is "20", the read data is "1", and the controlling part 1 takes in the received data as the one for itself.

On the other hand, when the value is not "20", access is made to the address where the stored data is "0", and therefore "0" is read. In this case, the controlling part 1 neglects it as data for another equipment.

FIG. 6(c) shows the contents of the memory 2 of the terminal equipment whereto a plurality of TEI values are assigned. In this case, 7(000111), 35(100011) and 57(111001) are assigned as the TEI values in addition to the above-described "20". This means that the data of addresses of the first column (000) and the eighth row (111), the fifth column (100) and the fourth row (011), and the eighth column (111) and the second row (001) are "1". In this terminal equipment, in the case where any one of the TEI values 20, 7, 35 and 57 is given in the frame data FD, the read data DT becomes "1", and the controlling part 1 takes in this as the data for itself. FIG. 6(d) shows the data of the address in the case where the TEI value of the received data is "7" by hatching.

FIG. 6(e) shows the read data "0" in the case where the TEI value of the received data is "10"(001010) by hatching In this case, the received data is neglected.

As described above, in the case where the TEI values are assigned, when any one of the TEI values is released, the frame data FD having the corresponding control code part CNTL and the TEI value to be released is transmitted from the main apparatus 10. The controlling part 1 having received this gives this TEI value to the memory 2 as the address signal ADR, and gives the release signal RD. Now, in the case where the TEI value to be released is 57, as shown in FIG. 6(f), the data of the address of the eighth column and the second row is replaced by "0".

Figure 7:
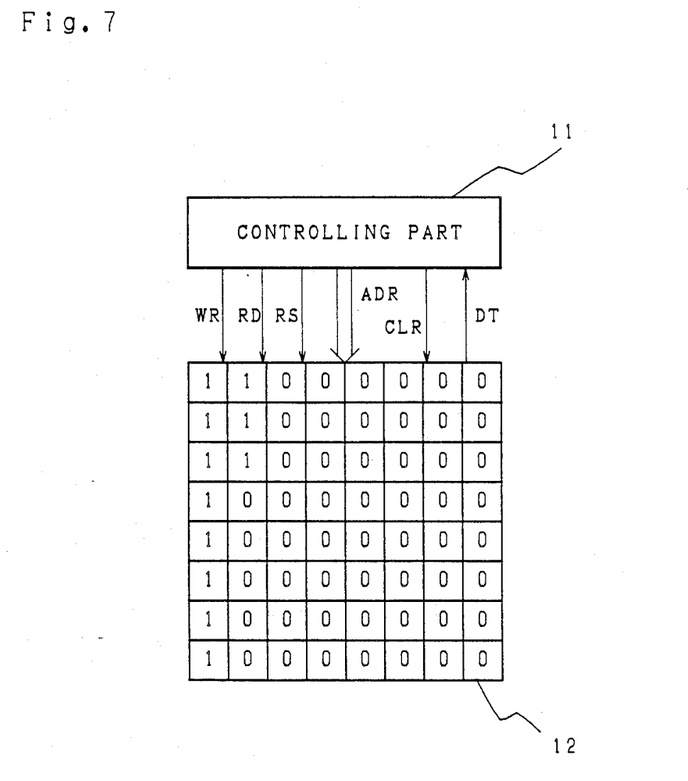
FIG. 7 is a block diagram of a major part of a circuit in the main apparatus side in accordance with the present invention.

Then, such a memory is also installed in the main apparatus 10 side. FIG. 7 shows a major part of the main apparatus 10 having a controlling part 11 and a memory 12. Before assigning the TEI values, the controlling part 11 gives the clear signal CLR to the memory 12, resetting all of the stored contents to "0". In assigning the TEI value to any one of the terminal equipment TE0, TE1 . . . TEn subsequently, the controlling part 11 gives this TEI value to the memory 12 as the address signal ADR, and gives the write signal WR to the memory 12. Thereby, the data of the address corresponding to the TEI value having been assigned becomes 1. Now, in the case where "0", "1", "2", "3", "4", ... "10" are assigned as the TEI values to a single or a plurality of terminal equipments, the contents of the memory becomes as shown in FIG. 7.

Then, in the case where the TEI value is assigned anew to any one of the terminal equipments, the TEI value having been assigned must not be used. Then, the controlling part 11 gives the TEI value planned to be assigned to the memory 12 as the address signal ADR, giving the read signal RD to the memory 12. Thereby, the data DT of the corresponding address is read out to the controlling part 11.

If the read data DT is "0", the TEI value thereof has not been assigned, and in reverse, if it is "1", it can be judged that the value has been assigned.

In the case where the TEI value having been assigned is released, this TEI value is given to the memory 12 as the addrss signal ADR, and the release signal RS is given to the memory 12. Thereby, the data of the corresponding address is re-written from "1" to "0", becoming a value which can be assigned anew.

Figure 8:
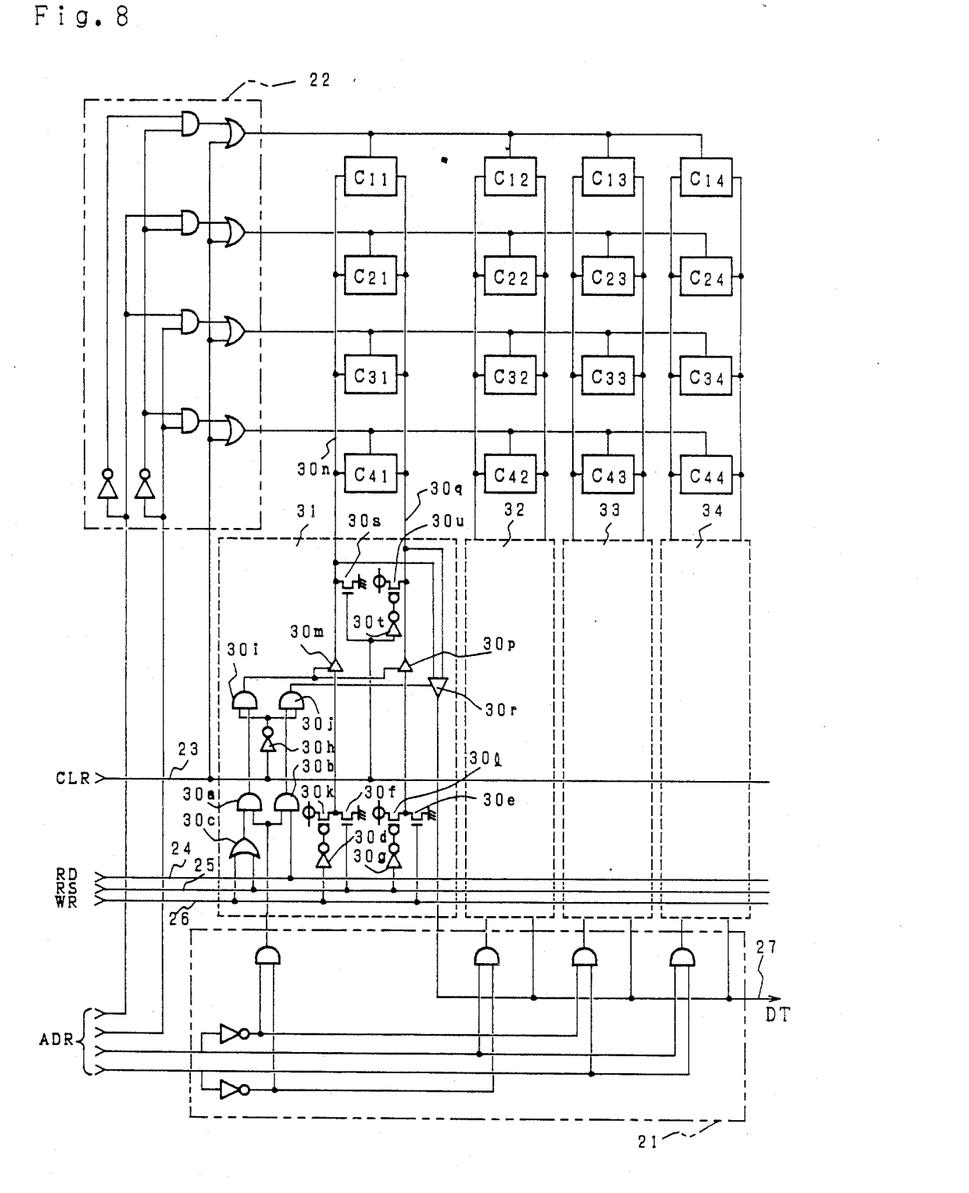
FIG. 8 is a circuit diagram of the memory and its surroundings.
Figure 9:
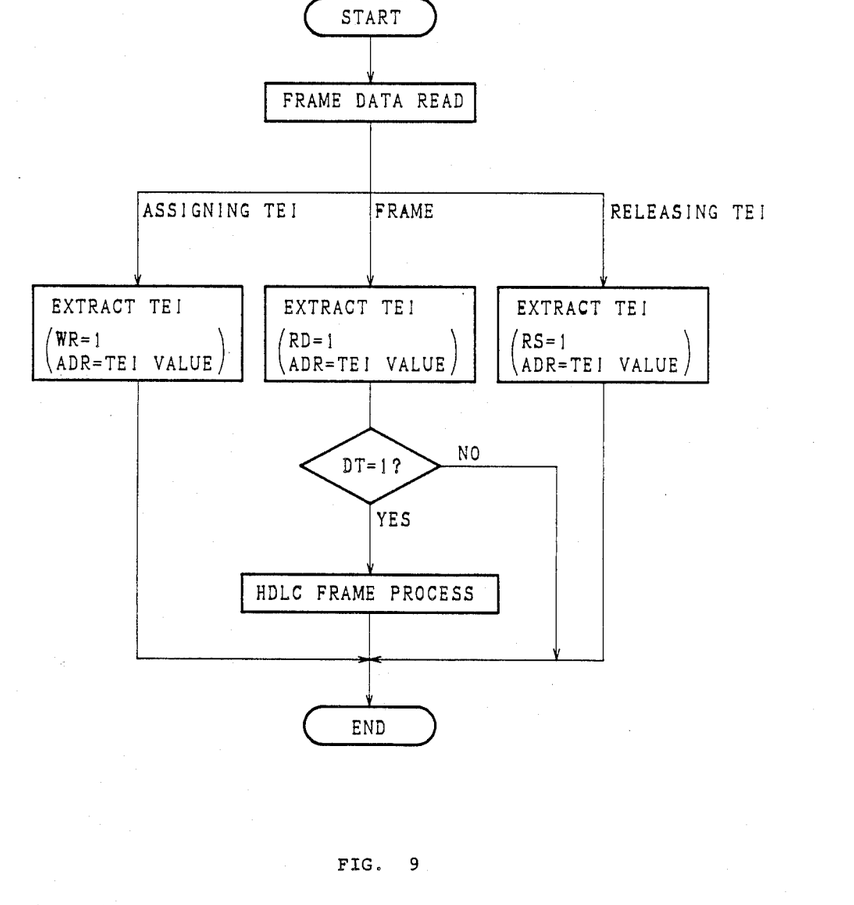
FIG. 9 is a flow chart illustrating the series of steps executed by a controlling part 1 depicted in FIG. 4.

FIG. 8 is a circuit diagram showing a configuration of the memory 2 or 12, and here an example in the case where the total number of TEIs is 16 ($=2^4$) is illustrated, and a memory has a configuration of four rows and four columns, and the address signal ADR is of four bits.

The high-order two bits and the low-order two bits of the address signal ADR are given to address decoding parts 21 and 22. The first, the second, the third and the fourth columns are selected corresponding to (0,0), (0,1), (1, 0), and (1, 1) of the two high-order bits respectively, and the first, the second, the third and the fourth rows are selected corresponding to (0, 0), (0, 1), (1, 0) and (1,1) of the two low-order bits respectively. Symbols $C_{11}$, $C_{12}$... $C_{44}$ designate memory cells, and symbol Cij (i, j = 1~4) designates a cell of row i and column j. Numerals 31, 32, 33 and 34 designate writing and reading circuits on a column basis installed for writing, reading, releasing and clearing. These writing and reading circuits 31, 32, 33 and 34 are configurated with combinations of logical circuits, and are given the clear signal CLR, the read signal RD, the release signal RS and the write signal WR through respective lines 23, 24, 25 and 26, being given the select signal of each column from the address decoding part 21. Also, the read data DT is outputted through a data line 27.

Next, description is made on a configuration of the writing and reading circuit 31 and the like. Output of the address decoding part 21 is given to AND gates 30a and 30b. The write signal WR is given to an OR gate 30c, an inverter 30d and the gate of an N-channel transistor 30e one end of which is of ground potential. The release signal RS is given to the OR gate 30c, the gate of a N-channel transistor 30f and an inverter 30g. The read signal RD is given to the AND gate 30b. The clear signal CLR is given to AND gates 30i and 30j through an inverter 30h, and to the gate of a N-channel transistor 30s and an inverter 30t.

Output of the OR gate 30c is given to the AND gate 30a. Output of the inverter 30d is given to the gate of a P-channel transistor 30h which is connected in series to the N-channel transistor 30f and is positioned on the power source side. Output of the inverter 30g is given to the gate of a P-channel transistor 30 which is connected in series to the N-channel transistor 30e and is positioned on the power source side. The potential of the intermediate node of a series circuit of transistors 30k and 30f is given to a bit line 30n through a tri-state buffer 30m. The potential of the intermediate node of a series circuit of the transistors 30 and 30e is given to a bit line 30q through a tri-state buffer 30p. Outputs of the AND gates 30a and 30b are given to the AND gates 30i and 30j, respectively. Output of the AND gate 30i is used as control signals of the tri-state buffers 30m and 30p, and output of the AND gate 30j is used as a control signal of a sense amplifier 30r. The sense amplifier 30r outputs binary data corresponding to the level of bit lines 30n and 30q as a readout signal to the data line 27.

Output of the inverter 30f is given to the gate of a P-channel transistor 30u. The transistor 30s is inserted between the bit line 30n and the ground potential, and the transistor 30u is inserted between the power source potential and the bit line 30q.

Next, description is made on the operation of this writing and reading circuit 31. When a control signal is given, the transistors 30s and 30r are both put in the conductive state, the bit line 30n goes low, the bit line 30q goes high, and "0" is written to each memory cell.

When the write signal WR is given, one input of the AND gate 30a of the column selected by the address decoding part 21 goes high, and therefore the output of the AND gate 30i goes high, and the tri-state buffers 30m and 30p are opened. On the other hand, the transistors 30k and 30e are turned on, and therefore, the bit line 30n goes high, and the bit line 30q goes low, and in reverse to the case of the clear signal, "1" is written to the memory cell of the selected memory row.

In reverse, in the case where the release signal RS is given, the tri-state buffers 30m and 30p are opened likewise, but in this case, the transistors 30f and 30 are turned on, and therefore the bit line 30n goes low, the bit line 30q goes high, and "0" is written to the selected memory cell.

Next, in the case where the read signal RD is given, the output of the AND gate 30b of the selected column goes high, and the output of the AND gate 30j starts the sense amplifier 30r to read the contents of the accessed memory through the bit lines 30n and 30q.

In accordance with the present invention as described above, in the terminal equipment, the amount of hardware is constant irrespective of the amount of TEIs to be assigned, and the time required for comparison is also constant, and thereby the present invention is effective to make the equipment smaller-sized and to make the operation faster. Also, the amount of TEIs to be assigned can be determined posteriorly, and therefore the restrictions in design and manufacture are alleviated to a large extent.

On the other hand, in the main apparatus side, it is possible to immediately judge whether or not the TEI value has been already assigned.

Thus the present invention exerts an excellent effect.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A terminal equipment identifier controlling circuit, for use in a communication apparatus which identifies terminal equipment by means of terminal equipment identifiers, comprising:

a memory, having a plurality of address storage locations, associated with a given terminal equipment unit;

means, coupled to said memory, for supplying said memory with a given terminal equipment identifier as an address signal;

means, coupled to said memory and to said supplying means, for writing binary data, indicating whether said given terminal equipment unit is to respond to said given terminal equipment identifier to a storage location of said memory corresponding to said address signal given by said supplying means;

means, coupled to said memory, for reading said binary data from said storage location; and means, coupled to said reading means, for responding to said data associated with said given terminal equipment identifier when said read binary data indicates said terminal equipment has been assigned said terminal equipment identifier.

2. A terminal equipment identifier controlling circuit adapted for use in terminal equipment useful in a communication system which identifies the terminal equipment connected to a network by means of terminal equipment identifiers, comprising:

memory associated with a given terminal equipment unit for storing binary data at a plurality of address storage locations;

means, coupled to said memory, for resetting said binary data storage locations of said memory to a first value indicating an unassigned state of said given terminal equipment unit for possible terminal equipment identifiers representative of address signals to be supplied to said terminal equipment;

means, coupled to said memory, for supplying said memory with a given terminal equipment identifier, said terminal equipment identifier supplied from the network side as an address signal;

means, coupled to said supplying means, for writing a second value to an address location corresponding to said address signal;

means for reading the data from the address location of said memory corresponding to said terminal equipment identifier when receiving a transmitted signal comprising said terminal equipment identifier from the network side; and means for judging that said transmitted signal is for itself when the read data is the second value.

3. In a communicating apparatus identifying terminal equipment connected to a network by means of terminal equipment identifiers, a terminal equipment identifier controlling circuit comprising:

a memory having a capacity of at least the total number of terminal equipment identifiers;

a means, coupled to said memory, for resetting the contents of said memory to a first value;

a means for giving said memory a terminal equipment identifier as an address signal thereof in assigning said terminal equipment identifier to the terminal equipment and writing a second value to an address location corresponding to said address signal;

a means for giving said memory an arbitrary terminal equipment identifier as an address signal thereof and reading the data of the corresponding address location of the memory; and a means, coupled to said giving means, for responding to data associated with said arbitrary terminal equipment identifier when said read data indicates said terminal equipment has been assigned said arbitrary terminal equipment identifier.

4. A terminal equipment identifier control circuit for determining if a particular terminal equipment, having a particular equipment number, connected to a network is a destination for data received by the terminal equipment which is identified by a terminal equipment identifier, comprising:

a memory coupled to the particular terminal equipment, said memory having a plurality of address storage locations;

said memory having prestored at a preselected one of said address storage locations corresponding to said particular equipment number, a value indicating said particular terminal equipment has been assigned said particular equipment number;

means, coupled to said memory and responsive to the terminal equipment identifier, for reading data stored at one of said address locations corresponding to said terminal equipment identifier; and means, coupled to said reading means and said particular terminal equipment, for establishing that said particular terminal equipment is to accept the data associated with said terminal equipment identifier if said read data equals said value.

5. A terminal equipment identifier control circuit for determining if a particular terminal equipment, having a plurality of equipment numbers, connected to a network is a destination for data received by the terminal equipment which is identified by a terminal equipment identifier, comprising:

a memory coupled to the particular terminal equipment, said memory having a plurality of address storage locations for storing a lookup table;

said lookup table prestoring a first value at select ones of said address storage locations, said select locations corresponding to a particular equipment number of said particular terminal equipment, said first value indicative that for each said particular equipment number, said particular terminal equipment has been assigned;

means, coupled to said memory and responsive to the terminal equipment identifier, for reading a data value from a select address location of said lookup table, said select address location corresponding to said terminal equipment identifier; and means, coupled to said reading means and said particular terminal equipment, for establishing that said particular terminal equipment is to accept the data associated with said terminal equipment identifier if said data value equals said first value.

* * * * *

REEXAMINATION CERTIFICATE (3584th)
United States Patent [19]
Nakabayashi et al.

[11] B1 4,879,715
[45] Certificate Issued Aug. 4, 1998

[54] TERMINAL EQUIPMENT IDENTIFIER CONTROLLING CIRCUIT

[75] Inventors: Takeo Nakabayashi; Hideki Andou, both of Itami, Japan

[73] Assignee: Mitsubishi Denki Kabushiki Kaisha, Tokyo, Japan

Reexamination Request:
No. 90/004,649, May 22, 1997

Reexamination Certificate for:
Patent No.: 4,879,715
Issued: Nov. 7, 1989
Appl. No.: 217,011
Filed: Aug. 22, 1988

[30] Foreign Application Priority Data

Jan. 19, 1988 [JP] Japan .................................... 63-9951
[51] Int. Cl.$^6$ .................................................. H04J 3/24
[52] U.S. Cl. ................................ 370/475; 340/825.52
[58] Field of Search ............................ 370/357, 360, 370/381, 382, 389, 420, 475; 340/825.21, 825.52, 825.53

[56] References Cited

U.S. PATENT DOCUMENTS

3,790,717  2/1974  Abramson et al. ................ 370/431
4,628,315  12/1986  Douglas ........................ 340/825.52
4,689,786  8/1987  Sidhu ................................ 370/255
4,788,637  11/1988  Tamaru ............................ 370/474

FOREIGN PATENT DOCUMENTS

2932868 A1  3/1980  Germany.
2937785 A1  4/1981  Germany.
38 28 289.5  5/1989  Germany.

OTHER PUBLICATIONS

Siemens, ICC (ISDN Communication Controller) PEB 2070 Technical Description, date unavailable.

Motorola, Semiconductor, Technical Data, Dual Data Link Controller (DDLC), Feb. 27, 1987.

Intel (Yager), Application Note AP-235, An 82586 Data Link Driver, Nov. 1986.

*Primary Examiner*—Alpus H. Hsu

[57] ABSTRACT

The present invention relates to a circuit controlling terminal equipment identifiers identifying said terminal equipment in a communicating apparatus wherein a number of the above-mentioned terminal equipment are connected to a network, and makes it possible to reduce the amount of hardware make the operation faster and facilitate the control of TEI assignment by using the address of a memory storing binary data as the TEI value.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–5 is confirmed.

* * * * *